US006227272B1

(12) United States Patent
Lindsay et al.

(10) Patent No.: US 6,227,272 B1
(45) Date of Patent: May 8, 2001

(54) PORTABLE MECHANICAL DEVICE FOR SEALING MATERIAL TREATED WITH PRESSURE SENSITIVE GLUE

(76) Inventors: Wayne R. Lindsay, 5 Northway Cir. #5, Dover, NH (US) 03820; Brett A. Lindsay, 163 Colonial Village, Somersworth, NH (US) 03878

( * ) Notice: Subject to any disclaimer, the term of this patent is extended or adjusted under 35 U.S.C. 154(b) by 0 days.

(21) Appl. No.: 09/211,619

(22) Filed: Dec. 15, 1998

(51) Int. Cl.[7] ...................... B32B 31/04
(52) U.S. Cl. ...................... 156/555; 156/582
(58) Field of Search ...................... 156/555, 582, 156/583.1; 100/160, 173, 176

(56) References Cited

U.S. PATENT DOCUMENTS

| | | | | |
|---|---|---|---|---|
| 3,309,983 | * | 3/1967 | Dresser | 156/555 X |
| 3,421,966 | * | 1/1969 | McLaughlin | 156/555 |
| 3,453,165 | * | 7/1969 | Isbey et al. | 156/555 X |
| 3,453,169 | * | 7/1969 | Buck et al. | 156/555 X |
| 3,901,758 | * | 8/1975 | Humphries | 156/499 |
| 5,073,076 | * | 12/1991 | Parkhill et al. | 412/33 |
| 5,133,828 | | 7/1992 | Jacques | 156/312 |
| 5,183,527 | | 2/1993 | Parker | 156/555 |
| 5,211,793 | | 5/1993 | Jacques | 156/312 |
| 5,275,684 | * | 1/1994 | Marazzi et al. | 156/359 |
| 5,368,677 | * | 11/1994 | Ueda et al. | 156/362 |
| 5,540,806 | | 7/1996 | Traise | 156/555 |
| 5,643,391 | * | 7/1997 | Couillard et al. | 156/324 |
| 5,656,118 | | 8/1997 | Traise | 156/290 |
| 5,772,841 | | 6/1998 | Lindsay | 156/555 |

* cited by examiner

*Primary Examiner*—James Sells
(74) *Attorney, Agent, or Firm*—Davis & Bujold, P.L.L.C.

(57) ABSTRACT

A low speed, low cost mechanical device for sealing folded product treated with pressure sensitive adhesive into ready to mail documents. Designed as a stand-alone machine powered by a gear motor for small business applications or as a back-up machine for larger users of pressure seal products. The unit can also be used in conjunction with any form folder for a more "automated" system.

12 Claims, 2 Drawing Sheets

PORTABLE MECHANICAL DEVICE FOR SEALING MATERIAL TREATED WITH PRESSURE SENSITIVE GLUE

BACKGROUND

1. Field of Invention

This invention relates to a small, low cost device for the mechanical sealing of pressure sensitive glue treated material, specifically business forms, used as "self-mailing"pieces. The machine can be used "off line" as a stand-alone device for sealing small runs of forms, either as a back up for other larger pressure sealing machines, or as the primary sealer for small businesses. The machine can also be used in conjunction with separate forms folding device for a more automated system.

2. Description of Prior Art

Until now the cost of pressure sensitive self-mailer forms has limited the market to large volume users. The majority of equipment design has consequently been for high-speed heavy-duty applications. With the advent of competition in the manufacture of pressure sensitive forms, prices per form are now within the range of small volume users. The problem to date in getting small users into pressure seal product has been the high cost of the equipment necessary to seal the product.

In addition, a market exists for a back up or emergency machine for existing users of pressure seal forms if their primary sealer is broken, while waiting for service. While users of water activated adhesives can manually apply water via sponges to their documents and users of heat sensitive adhesive can actually "iron" them with an electric iron until service is restored, pressure seal users have no back-up alternative.

U.S. Pat. No. 5,540,806 to Traise (1995) discloses a "table-top" sealer for low speed, low volume applications, which utilizes narrow edge rollers and a complex pivoting yoke mechanism.

U.S. Pat. No. 5,656,118 to Traise (1997) an improvement to U.S. Pat. No. 5,540,806 still utilizes narrow edge sealing rollers with a cumbersome method of removing and replacing different size bolts to activate/deactivate the sealing pressure.

U.S. Pat. No. 5,183,527 to Parker (1993) is a portable "perimeter" pressure sealer, also utilizing narrow edge wheels that seal only the edges of a document.

U.S. Pat. No. 5,133,828 (1991) and U.S. Pat. No. 5,211,793 to Jacques (1993) still utilize an edge only sealing method with the addition of complex electronics to reverse motor direction, moving the form forward and back within the sealer.

U.S. Pat. No. 5,772,841 to Lindsay (1998) details an "in-line" pressure sealing machine that utilizes two sets of biased rollers to effect product seal. The machine seals the product, which is fed through in the shorter width orientation as delivered from a form folder in line with the sealer.

While some of the features of these patents are unique, nevertheless they all suffer from several disadvantages:

The small units only seal the edges of the document, one side at a time.

The small units require that the form be reinserted in the sealer to seal the opposite edges either manually or through a complicated electronic method.

They are expensive to manufacture and consequently expensive to purchase.

They all require complicated adjustments to control sealing roll pressure or relief.

OBJECTS AND ADVANTAGES

Accordingly, several objects and advantages of the present invention are:

(a) To provide a pressure sealing device that is mechanically simple and very low cost to manufacture;

(b) To provide a pressure sealer that seals the entire document in one pass.

(c) To provide a pressure sealer that can be used as a stand-alone unit or used in conjunction with any commercial form folder.

(d) To provide a pressure sealer that requires no adjustments to pressure or relief rollers.

Still further objects and advantages will become apparent from a consideration of the ensuing description and drawings.

DRAWING FIGURES

Reference Numerals in Drawings

| | |
|---|---|
| 10 - left-hand side plate | 11 - right hand side plate |
| 12 - exit plate | 13 - bottom plate |
| 14 - infeed guide plate | 15A - front bottom sealing roll |
| 15B - upper sealing roll | 15C - rear bottom-sealing roll |
| 16 - gear motor | 17 - deflector bar |
| 18 - thrust washers | 19 - needle bearings |
| 20 - motor drive gear | 21 - idler gear |
| 22 - shoulder bolt for securing idler | 23A - front bottom sealing roll gear |
| 23B - upper sealing roll gear | 23C - rear bottom sealing roll gear |
| 24 - infeed tray securing screws | 25 - deflector bar securing screws |
| 26 - motor securing screws | 27 - exit panel-securing screws |
| 28 - roll pins | 29 - cosmetic & safety enclosure |
| 30 - enclosure screws | 31 - complete mini module |

DESCRIPTION

Figure 1:
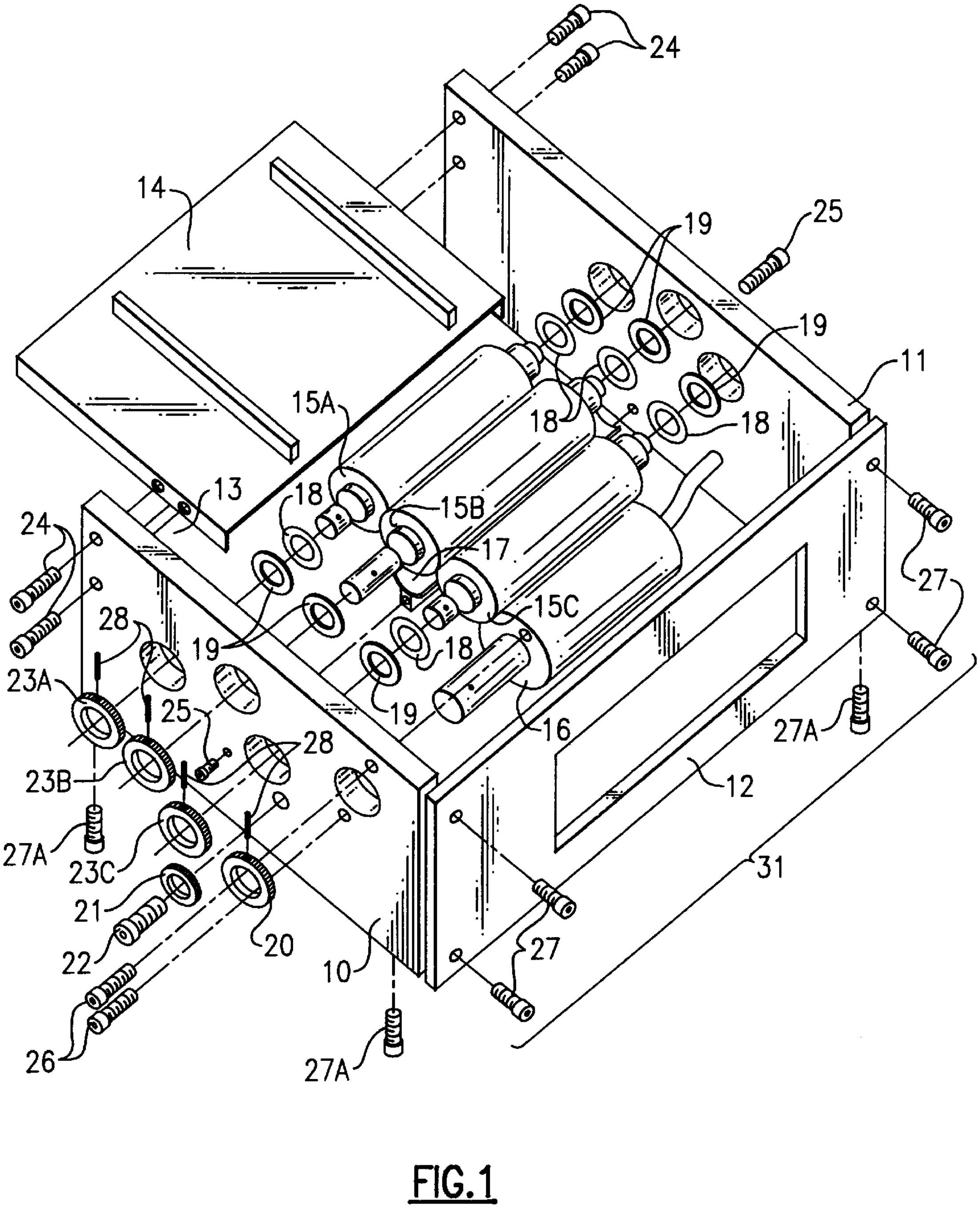
FIG. 1 shows and exploded isometric of the pressure seal module.
Figure 2:
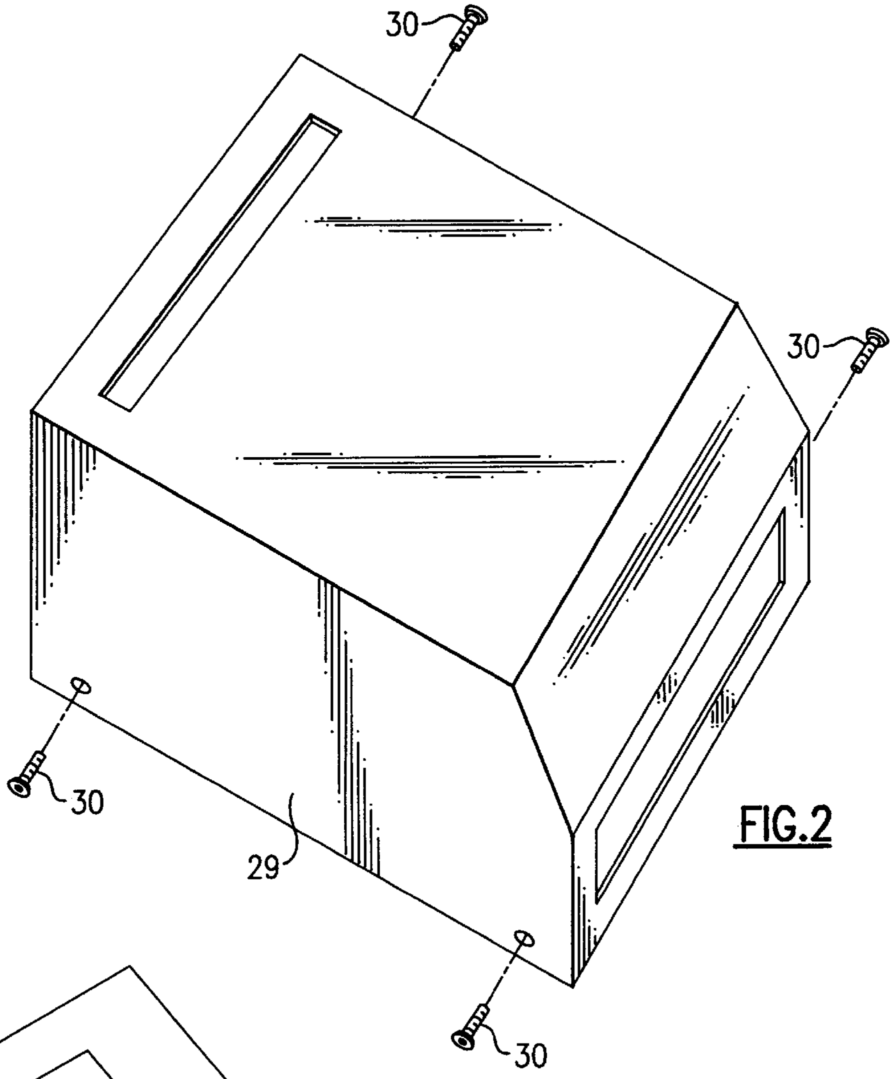
FIG. 2 shows a typical safety and cosmetic enclosure.
Figure 3:
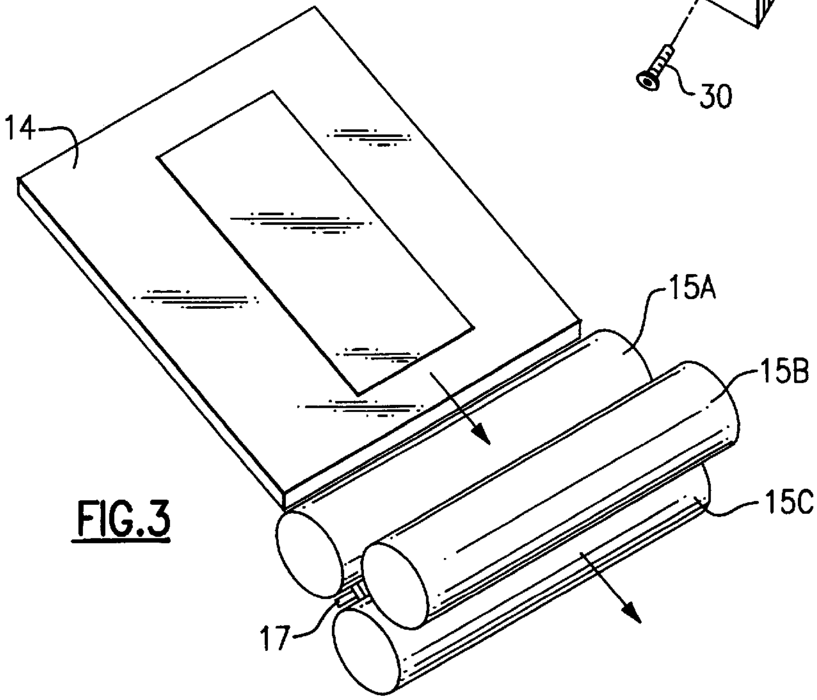
FIG. 3 shows the product flow through the sealer in the lengthwise orientation.

FIGS. 1 to 3

A typical embodiment of the mini pressure sealer is shown in FIG. 1 (exploded isometric). The pressure sealer is composed of a right and left hand side frame 10&11 typically metal, a front and bottom plate 12&13 typically metal, an infeed guide plate 14 typically metal, three pressure rollers 15A–15B&15C typically steel, six sealed bearings 19, five thrust washers 6 typically metal, three drive gears 23A–23B&23C typically plastic, one idler gear 21, typically steel, and one motor gear 20 typically steel. A flex deflector bar 17 typically metal, an AC gear motor 16, and various mounting hardware. A safety and cosmetic enclosure shown in FIG. 2–29.

Typically bearings 19 are pressed into side frames 10 and 11. Thrust washers 18 are installed on the left and right hand end of pressure rollers 15A–15B&15C as required. Pressure rollers 15A–15B&15C are pressed into bearings 19 already pressed into side frame 11. Flex deflector shaft 17 is pressed into side frame 11 and secured with mounting screw 25. Side frame 10 is placed over the left-hand journals of pressure rollers 15A–15B&15C through bearings 19 on that side.

Flex deflector bar 17 is aligned with it's hole on side frame 10 and loosely secured with opposite screw 25. Side plates 10 and 13 are dropped in milled slots in bottom plate 13 and secured with mounting screws 27A. Drive motor 16 is installed with the drive shaft protruding through side frame 10 and secured with mounting screws 26. Motor gear 20 is installed on motor shaft and pined with a roll pin 28. Idler gear 21 is meshed with motor gear 20 and secured to side frame 10 with shoulder bolt 22. Drive gears 23A–23B&23C are pressed on the ends of pressure rollers 15A–15B&15C respectively and pined with roll pins 28. Infeed guide plate 14 is secured between side plates 10&11 with mounting screws 24. Front plate 12 is secured to side plates 10&11 with mounting screws 27. All screws are tightened. The cosmetic—safety enclosure 29 is placed over the module and secured with mounting screws 30.

The product flow through the mini pressure sealer module 31 is shown in FIG. 3, indicating the lengthwise seal of the product.

OPERATION

FIGS. 1, 3

The present invention is driven by an AC gearmotor 16, which turns motor gear 20. Motor gear 20 meshes and turns idler gear 21, which in turn drives sealer roll gears 23A–23B&23C, rotating sealer rolls 15A–15B&15C. Product to be sealed is placed on infeed guide 14. Gravity forces the product into contact with sealer rolls 15A&15B where it is pinched and pulled between them. The product then encounters flex deflector bar 17 that forces it up under pressure roll 15B and over pressure roll 15C. The forward motion of the pressure rolls deposits the now sealed product out through the exit hole in front plate 12, onto a desk or other customer supplied container.

SUMMARY, RAMIFICATIONS, AND SCOPE

Accordingly, the reader will see that the pressure seal module of this invention is very simple and is significantly less expensive to manufacture than any other pressure sealer presently available. Furthermore, this invention has additional advantages in that:

- it utilizes a lengthwise placement of the product to form a complete seal;
- it utilizes a unique "flex" deflector in the three pressure roller station;
- It utilizes a split capacitor drive that automatically reverses the motor rotation if the stall torque of the motor is exceeded which clears any jams that may occur without manual intervention.

Although the description above contains specifications, these should not be construed as limiting the scope of the invention but as merely providing an illustration of one preferred embodiment of this invention. Thus the scope of the invention should be determined by the claims and their legal equivalents, rather than by the example given.

We claim:

1. A pressure seal device for pressure sealing a folded article treated with a pressure sensitive adhesive comprising:

a seal device frame having an input for receiving the folded article to be sealed and an output for outputting the folded and sealed article; and a first roller, a second roller and a third roller supported by the seal device frame, the first and second rollers defining a first linear contact for applying initial sealing pressure to the folded article and the second and third rollers defining a second linear contact for applying a final sealing pressure to the folded article.

2. A pressure seal device for pressure sealing a folded article treated with a pressure sensitive adhesive comprising:

a seal device frame having an input for receiving the folded article to be sealed and an output for outputting the folded and sealed article;

a first roller, a second roller and a third roller supported by the seal device frame, the first and second rollers defining a first linear contact for applying initial sealing pressure to the folded article and the second and third rollers defining a second linear contact for applying a final sealing pressure to the folded article; and a deflector bar being located adjacent both the first linear contact and the second linear contact points for guiding the folded article as the folded article exits the first linear contact toward the second linear contact.

3. The pressure seal device as set forth in claim 2, wherein the folded article has a pair of first edges and a pair of second edges, the second edges having a greater length than the first edges and the input feeds one of the pair of first edges into the first linear pressure point.

4. The pressure seal device as set forth in claim 2 wherein the first, second and third rollers are all metal pressure rollers.

5. The pressure seal device as set forth in claim 2 wherein the first roller and the third roller both rotate in a first direction and the second roller rotates in a second opposite direction of rotation.

6. The pressure seal device as set forth in claim 2 wherein the first, second and third rollers rotate about respective fixed first, second and third longitudinal axes, and the fixed first, second and third longitudinal axes facilitate application of a constant setting roll pressure for both the first and second linear contacts.

7. The pressure seal device as set forth in claim 2 wherein a single motor is connected to drive the first, second and third rollers.

8. The pressure seal device as set forth in claim 2 wherein the input comprises a substantially planar infeed guide plate for feeding the folded article to be sealed.

9. The pressure seal device as set forth in claim 2 herein the output, for outputting the folded and sealed article, is a plate with an opening provided therein.

10. The pressure seal device as set forth in claim 2 wherein each of the first, second and third rollers is supported by a pair of opposed bearing to facilitate rotation of each of the first, second and third rollers.

11. The pressure seal device as set forth in claim 2 wherein the seal device frame, the first second and third rollers and the deflector bar are all accommodated within an exterior housing.

12. A pressure seal device for pressure sealing a folded article treated with a pressure sensitive adhesive comprising:

an exterior housing accommodating a seal device frame having an input for receiving the folded article to be sealed and an output for outputting the folded and sealed article;

only a first roller, a second roller and a third roller being supported by the seal device frame, the first and second rollers defining a first linear contact for applying initial sealing pressure to the folded article and the second and third rollers defining a second linear contact points for applying a final sealing pressure to the folded article;

a deflector bar being located adjacent both the first linear contact and the second linear contact points for guiding the folded article as the folded article exits the first linear contact toward the second linear contact;

the first roller and the third roller both rotating, during operation, in a first direction and the second roller rotates in a second opposite direction of rotation, and the first, second and third rollers rotating about respective fixed first, second and third fixed longitudinal axes, and the fixed first, second and third longitudinal axes facilitating application of a constant setting roll pressure for both the first and second linear contacts, and a single motor is connected to drive the first, second and third rollers; and the input comprises a substantially planar infeed guide plate for feeding the folded article to be sealed and the output, for outputting the folded and sealed article, is a plate with an opening provided therein, and each of the first, second and third rollers is supported by a pair of opposed bearings to facilitate rotation of each of the first, second and third rollers.

* * * * *